(12) United States Patent
Sharma et al.

(10) Patent No.: US 11,681,974 B2
(45) Date of Patent: *Jun. 20, 2023

(54) SYSTEMS, METHODS, AND DEVICES FOR TRACKING A SHIPMENT USING A WIRELESS TRACKER

(71) Applicant: ROAMBEE Corporation, Santa Clara, CA (US)

(72) Inventors: Sanjay Sharma, Santa Clara, CA (US); Vidya Subramanian, Santa Clara, CA (US); Pankaj Patel, Santa Clara, CA (US); Premsai Sainathan, Santa Clara, CA (US); Praveen Koka, Santa Clara, CA (US); Rainer Kuehling, Santa Clara, CA (US)

(73) Assignee: ROAMBEE Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/196,977

(22) Filed: Mar. 9, 2021

(65) Prior Publication Data
US 2021/0216963 A1    Jul. 15, 2021

Related U.S. Application Data

(63) Continuation of application No. 16/537,418, filed on Aug. 9, 2019, now Pat. No. 11,042,828, which is a
(Continued)

(51) Int. Cl.
*G06Q 10/0833* (2023.01)
*H04W 4/029* (2018.01)

(52) U.S. Cl.
CPC ........ *G06Q 10/0833* (2013.01); *H04W 4/029* (2018.02)

(58) Field of Classification Search
CPC ............ G06Q 10/083; G06Q 10/0832; G06Q 10/0833; G06Q 10/0835; G06Q 10/0837; G06Q 10/0838; H04W 4/029
See application file for complete search history.

(56) References Cited

U.S. PATENT DOCUMENTS

| | | |
|---|---|---|
| 2003/0061176 A1 | 3/2003 | Hoar |
| 2005/0205719 A1 | 9/2005 | Hendrickson et al. |
| | (Continued) | |

FOREIGN PATENT DOCUMENTS

WO    2011096813 A1    8/2011

OTHER PUBLICATIONS

Delaney et al., "Chapter 18: Dedicated Networking Solutions for a Container Tracking System"; in "Ambient Intelligence with Microsystems, Augmented Materials and Smart Objects" Springer (Year: 2008).*

(Continued)

*Primary Examiner* — Emmett K. Walsh (57) ABSTRACT

Embodiments of the present disclosure include systems, methods, and devices for tracking a shipment using a wireless tracker. In such embodiments, the wireless tracker determines a location of the wireless tracker device and regulates battery usage of wireless tracker based on the location. In addition, the wireless tracker is configured to determine a current location of the wireless tracker device at one or more intervals such that the one or more intervals are based on a delivery route of the shipment. Moreover, the wireless tracker is configured to receive and verify one or more codes to for a chain of custody of the shipment. Also, the wireless tracker is configured to determine a trigger event based on the location of the wireless tracker device and/or sensor information as well as send a notification to a computer server based on the trigger event.

43 Claims, 7 Drawing Sheets

Related U.S. Application Data continuation of application No. 14/656,189, filed on Mar. 12, 2015, now Pat. No. 10,438,162.

(60) Provisional application No. 61/951,555, filed on Mar. 12, 2014.

(56) References Cited

U.S. PATENT DOCUMENTS

| | | |
|---|---|---|
| 2012/0235791 A1* | 9/2012 | Donlan ............ G06Q 10/0833 340/10.1 |
| 2013/0147617 A1 | 6/2013 | Boling et al. |
| 2013/0321211 A1 | 12/2013 | Chakraborty et al. |
| 2014/0317005 A1 | 10/2014 | Balwani |
| 2015/0039267 A1 | 2/2015 | Busch et al. |
| 2015/0145650 A1 | 5/2015 | Levan et al. |

OTHER PUBLICATIONS

Delaney et. al.; "Chapter 18 Dedicated Networking Solutions for a Container Tracking System"; in "Ambient Intelligence with Mircrosystems, Agumented Materials and Smart Objects" Springer, 2008 (Year: 2008).

* cited by examiner

SYSTEMS, METHODS, AND DEVICES FOR TRACKING A SHIPMENT USING A WIRELESS TRACKER

BACKGROUND

Conventional tracking systems provide the ability for a company to locate human and/or material assets on demand whether it is indoors, outdoors or in transit. This capability allows the company to improve its quality of service, engendering improved customer satisfaction. Such conventional tracking systems use GPS/GSM tracking devices but these conventional tracking systems have several limitations that include but are not limited to the following. First, a tracking device owner does not have the ability to retrieve the tracking device once the asset that is being tracked/shipped has reached its destination. For example, in the context of a package shipped to New York from California via the United States Postal Service (USPS), the tracking device owner places the tracking device in the package to obtain location updates but upon reaching the destination the tracking device owner does not have the ability to have the tracking device returned to a desired location. The tracking device owner does not have the ability to define a new tracking destination or reuse the tracking device for a new destination upon arrival to the destination. In certain situation, if the origin of the shipment is not the origin of the tracking device owner, then the owner has to first ship the device to the origin of the shipment, typically a 3.sup.rd party logistics providers or their remote warehouse or their supplier locations, instruct them to include the tracking device in their desired shipment and once it reaches the destination, have to be responsible to retrieve it back to their main location.

Second, the tracking device provides current known locations at pre-defined update intervals and user defined geographic boundaries to provide location updates. Location updates may not be provided if an event occurs between two update intervals. For example, a user defines an alert condition when asset enters and exits a specified geographic boundary at an update interval of 30 minutes. If the asset enters and exits the specified geographic boundary within 30 minutes then the tracing device fails to provide an update.

Third, the conventional tracking devices have built-in batteries that are charged via a power supply. The consumption of battery power is directly proportional to the number of location updates the tracking device provides or power consumption of other tracker components. Many tracking applications become infeasible because the user requires frequent updates or frequent use of other components that exhaust battery life.

Fourth, a conventional tracking device provides updates to the device owner and relies on such updates to disseminate that update information to other users who are interested in following that asset being tracked.

Fifth, a conventional tracking device does not have the ability to authenticate and verify whether the asset/shipment coupled to the tracking device has been delivered to a destination and a chain of custody of the asset was not compromised. Such authentication may involve confirming the identity of an asset/shipment by a person or a module that traces the origins of the asset/shipment, or ensuring that the packaging or labeling of the asset/shipment is what it claims to be. Authentication often involves verifying the validity of at least one form of identification. Authentication further involves comparing the attributes of the asset itself to what is known about asset's origin. For example, consumer goods such as pharmaceuticals, perfume, fashion clothing may use authentication to prevent original goods replaced by counterfeit goods.

Sixth, a conventional tracking device does not have the ability to report tampering such as separating the tracking device from the tracked goods.

Seventh, a conventional tracking device does not have the ability of multi-dimensional tracking such as to determine and provide the ability to configure the rules of tracking based on, but not limited to, if-else-while of various parameter such as speed, altitude, temperature, pressure, location and change the behavior of tracking For example, international tracking intervals is changed while at sea, dynamically changing the tracking geo-boundaries and conditions.

Eight, a conventional tracking device does not have the ability to associate with the shipment order information and hence requires users to track the devices by their IDs instead of the shipment order information which includes but not limited to order number, purchase order number, Serial Shipment Container Code (SSCC), Billing of Lading number, Lorry Receipt (LR) number, Shipment Manifest number and others. For example, an order no. A345 may have 100 pallets and each pallet has a conventional tracking device. In order, to track order no. A345, the user needs to know the entire 100 conventional tracker IDs and track by their IDs.

Ninth, a conventional tracking device does not provide the condition of the shipment in transit such as if the shipment is not within its shipping temperature, humidity, moisture limits, or if the shipment was moved from one transport carrier to another, or the shipment was not handled properly.

Accordingly, there is a need for systems, methods, and devices for improved techniques to track an asset/shipment from any origin to any destination using a tracking device such that a tracking device can be returned to the tracking devices owner as well as the tracking device provides location and condition updates at useful intervals. Further, the tracking device has improved management of battery life, as well as the system allows a tracking device to take action based on update information provided by the tracking device, and authenticate the asset coupled to the tracking device to verify chain of custody. In addition, the tampering of the tracking device/wireless tracker and conditional/multi-dimensional tracking need to be addressed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Embodiments of the present disclosure include systems, methods, and devices for tracking a shipment or asset using a wireless tracker. In such embodiments, the wireless tracker determines a location of the wireless tracker device and regulates battery usage of wireless tracker based on the location. Further, in such embodiments, the wireless tracker may have one or more panels that include a sender address, sender postage, recipient address, or recipient postage such that the wireless tracker is delivered from the recipient address to tracking device owner. In addition, the wireless tracker is configured to determine a current location of the wireless tracker device at one or more intervals such that the one or more intervals are based on a delivery route of the shipment. Moreover, the wireless tracker is configured to receive and verify one or more codes to for a chain of custody of the shipment. Also, the wireless tracker is configured to determine a trigger event based on the location of the wireless tracker device and/or sensor information as well as send a notification to a computer server based on the trigger event.

Figure 1:
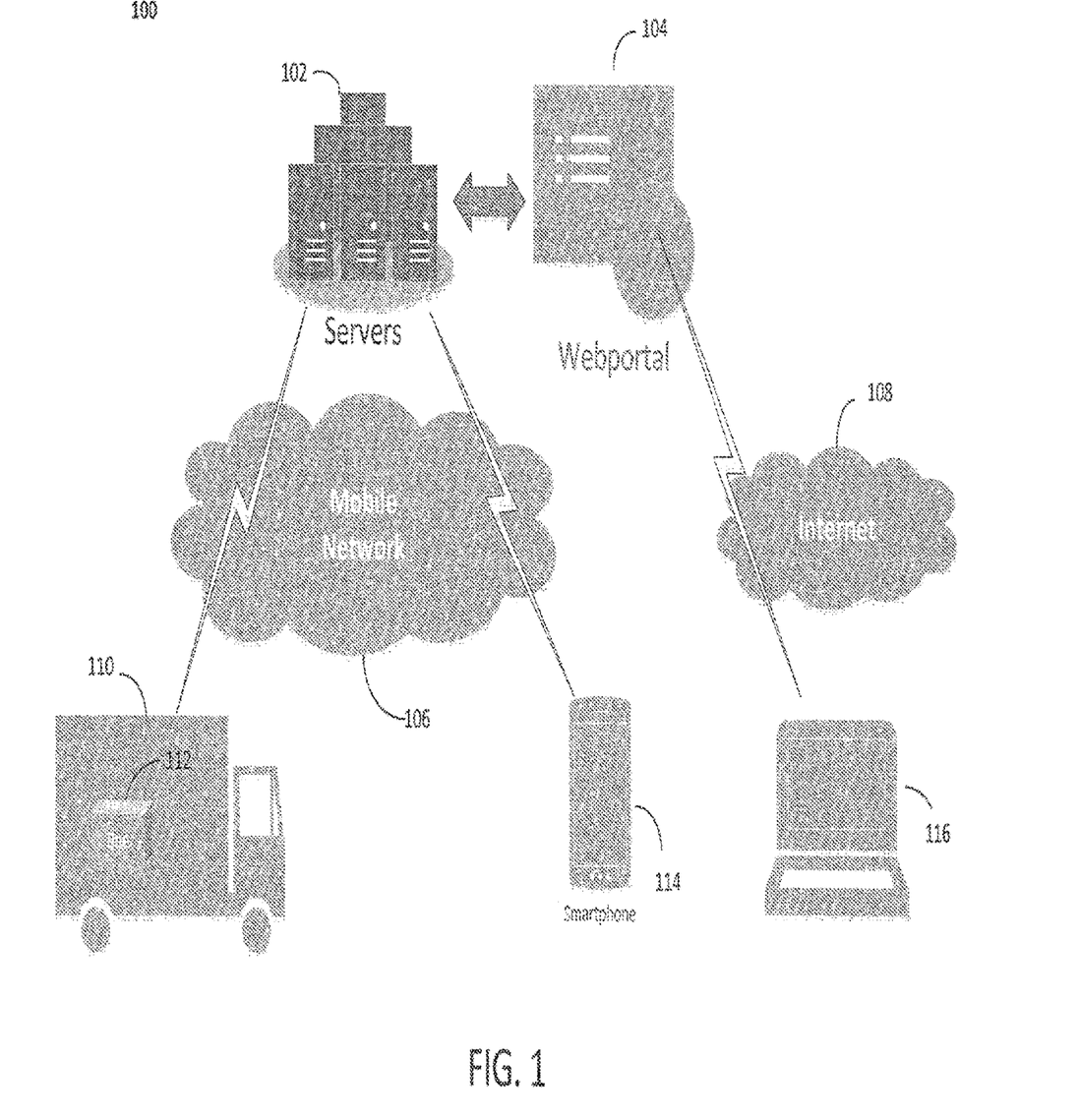
FIG. 1 is a functional block diagram of a system for tracking a shipment/asset using a wireless tracker, in accordance with some embodiments.

FIG. 1 is a functional block diagram of a system 100 for tracking a shipment using a wireless tracker, in accordance with some embodiments. Such a system 100 includes one or more computer servers 102 that may host a web portal 104 or other user portal. A user device (114-116) such as a smartphone, tablet computer, laptop computer, and desktop computer may access the web portal 104 over the Internet 108. Alternatively, a user device 114 may access the computer server(s) 102 across a mobile network 106. In addition, a shipment with a wireless tracker 112 may be on a shipping transportation vehicle 110 and is in communication with the computer server(s) 102 over the mobile network 106. Such a system may be used by a shipping delivery company or a company that frequently ships various assets among the company's facilities that are separated by geographic distances.

The system 100 allows a shipment order to be automatically generated by the computer server(s) for a shipper based on the information received from the wireless tracker as well as a predefined list of shipment locations. A shipper may be a company or any entity that uses shipment services to deliver goods across geographical disparate shipment locations. For example, shipment locations for a shipper may correspond to manufacturing plant or research and development facilities.

In one embodiment, the wireless tracker 112 may determine its location using a GPS device or communicating with one or more GPS devices over a network. Further, the wireless tracker may include a battery such that the wireless tracker 112 regulates battery usage based on the location of the wireless tracker 112. For example, when within a distance threshold of the shipment origin or shipment destination, the management module may request the communication module to determine a location of the wireless tracker 112 at frequent intervals so as to provide frequent updates to a shipper on the location status of the shipment. However, beyond a distance threshold of the shipment origin and prior to a distance threshold of a shipment destination, frequent location status updates may not be needed by the shipper. Thus, the management module may not request the communication module to determine the location of the wireless tracker as frequently thereby regulating battery usage of the communication module. The location of the wireless tracker 112 may be forwarded to the computer server(s) 102 from the wireless tracker 112. Further, the computer server(s) may forward the location of the wireless tracker 112 to user devices (114-116).

In another embodiment, the wireless tracker 112 may include one or more sensors that are configurable. Further, the wireless tracker 112 may access the receive sensor information from the one or more sensors. In addition, the wireless tracker 112 may determine a trigger event based on the location of the wireless tracker 112 or sensor information. In addition, the wireless tracker 112 may send or transmit a notification to the computer server 102 based on the trigger event. Further, the computer server(s) may forward the notification to user devices (114-116). Alternatively, the wireless tracker 112 may send or transmit a sensor information to the computer server 102. Further, the computer server(s) may forward the sensor information to user devices (114-116).

In additional embodiments, the wireless 112 tracker is configured to receive and verify one or more codes to for a chain of custody of the shipment. In one embodiment, the wireless tracker receives a code at a shipment origin and receives a code at a shipment destination. Based on such authentication, the wireless tracker may transmit a notification to the computer server(s) 102 verifying chain of custody.

In further embodiments, the wireless tracker 112 may determine that the location of the wireless tracker 112 is within a distance threshold of the shipment destination. In addition, the wireless tracker 112 determine that a code was received within a time threshold. Thus, if the code was received and verified by the authentication module of the wireless tracker 112 within both the distance threshold and the time threshold, then the wireless tracker 112 may transmit a notification to the computer server(s) 102 verifying chain of custody. However, if the code was not received by the authentication module within either the distance threshold or the time threshold, then the wireless tracker 112 may transmit a notification to the computer server(s) 102 indicating a break in chain of custody. Further, the computer server(s) may forward the verification notification or the break in chain of custody notification to user devices (114-116).

For example, a shipment destination may be known. The wireless tracker determines that it is near the shipment destination. A distance threshold may be configured as 500 meters. If an authentication code is received by the wireless tracker such that the wireless tracker is located beyond 500 meters of the shipment destination, then a notification is generated by the wireless tracker indicating a break in the chain of custody. The reason being that it may be likely that the package was stolen or otherwise compromised. However, if an authentication code is received by the wireless tracker such that the wireless tracker is located within 500 meters of the shipment destination then the wireless tracker determines that chain of custody is still intact. Further, is the authentication code is not provided within a time threshold of the wireless tracker being located within a distance threshold of the shipment destination, then a notification is generated by the wireless tracker indicating a break in the chain of custody. The reason being that it may be likely that the package may be hidden, stolen, or otherwise compromised. However, if the authentication code is provided to the wireless tracker within both the distance threshold of the shipment destination and the time threshold (and the code is authenticated) then a notification is generated by the wireless tracker that verifies chain of custody.

Figure 2A:
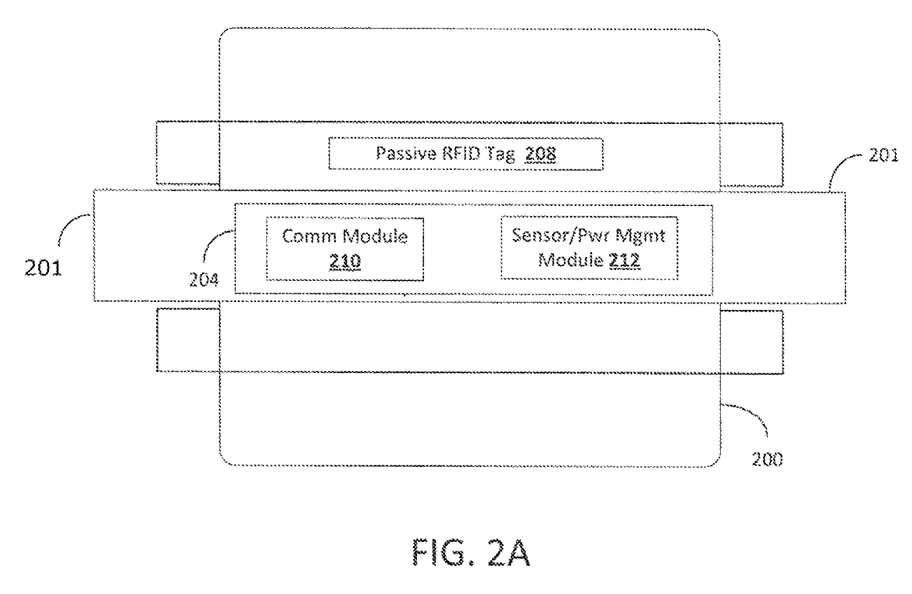
FIGS. 2A-2B are functional block diagrams of a wireless tracker, in accordance with some embodiments.

FIG. 2A is a functional block diagram of a wireless tracker 200, in accordance with some embodiments. The wireless tracker 200 includes mail and response card box 201, communication module 210 and authentication module 204 that is a bolted onto an integrated circuit board. A passive radio frequency identification (RFID) tag 208 is affixed to the card box 201 and programmed to have a unique identity/identification.

The wireless tracker 200 may be manufactured and operated in part by a third party manufacturer that may be used by a shipper or shipment delivery company. The third party manufacturer may own or operate one or more computer servers to communicate with the wireless tracker 200 over one or more wireless communication networks using the communication module 210. Further, the communication module 210 may be include one or communication interfaces configured to communicate over various wireless networks such as GPS, Zigbee, Zwave, WiFi, cellular/mobile, Bluetooth, WiMAX or any other wireless communication network. In addition, the communication module may have an interface to communicate with other devices over a wired network or a wired interface such as an Ethernet cable or USC interface. Such wired connections may be implemented when first configuring the wireless tracker 200 by the third party manufacturer prior to use.

In some embodiments, the communication module 210 is configured to determine a current location of the wireless tracker device at one or more intervals wherein the one or more intervals are based on a delivery route of the shipment. For example, the communication module 210 may be configured (by the management module 212) to determine the location of the wireless tracker frequently within a distance threshold of the shipment origin or shipment destination. However, the communication module 210 may be configured to determine the location of the wireless tracker not as frequently beyond the distance threshold of the shipment origin and prior to the distance threshold of the shipment destination. Although such a configuration manages battery life, such a configuration also avoids a situation when a user defines an alert condition when an asset enters and exits a specified geographic boundary that may not have been provided if the update interval was simply 30 minutes. In such a scenario, if the asset enters and exits the specified geographic boundary within 30 minutes then the tracing device fails to provide an update.

In an alternative embodiment, the management module 212 may receive sensor information from one or more sensors of the wireless tracker 200 at different time intervals. However, the management module may request sensor information for specific sensors only after the wireless tracker has moved to a different location thereby regulating battery life. For example, the wireless tracker 200 may include a humidity sensor. The management module 212 may be configured to only retrieve humidity sensor information when the wireless tracker has moved to a new location instead of at certain time intervals (e.g. every 30 minutes). Thus, the wireless tracker may stay at a certain location for a period of time (e.g. longer than 30 minutes) and the management module regulates battery usage/life by only gathering humidity sensor data when the wireless tracker has changed location. However, in other embodiments, the management module may request sensor information from sensors at certain time intervals associated or not associated with the location of the wireless tracker.

The wireless tracker 200 may have one or more sensors that include but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, and presence, etc. In one embodiment the sensor may include a location sensor. In another embodiment, the location sensor may be the communication module 210 communicating with a GPS device to retrieve location information of the wireless tracker 200. The management module 212 may be configured to configure the one or more sensors as well as receive sensor information from the one or more sensors. Further, the management module 212 may determine a trigger event based on the location of the wireless tracker device and/or sensor information. In addition, the management module 212 may transmit a notification to a computer server through the communication module based on the trigger event that is forwarded to a user device. Alternatively, sensor information may be provided to a computer server to determine a trigger event or notify the user. Moreover, a trigger event includes, but is not limited to, a shipment exiting shipment origin, delay at an intermediate location, traveling after a delay, temperature deviation, humidity deviation, route deviation, accident to delivery vehicle, tampering and shock to the delivery vehicle. Sensor may include, but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, anti-tampering and presence. etc.

The authentication module 204 is used to track the chain of custody of the shipment associated with the wireless tracker 200. In one embodiment, a shipper at a shipment origin may enter an authentication code into the authentication module 204. The authentication module 204 verifies the code either locally or transfers the authentication code to a computer server for verification. Once the authentication code is verified, the shipment with the wireless tracker 200 is shipped to the destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 and verified (either locally or at a server). In addition, the verification may include determining whether the wireless tracker 200 is within a distance threshold of the shipment destination in accordance with the shipment order.

The authentication code may or may not be on a package slip. Further, the authentication code may include, but is not limited to, an alphanumeric code (that can be randomly generated), a text code, a graphical code (such as bar code or QR code), and biometric code (such as a fingerprint, signature, retinal scan, facial recognition, voice recognition, etc.).

In further embodiments, the management module 212 may determine that the location of the wireless tracker 200 is within a distance threshold of the shipment destination. Further, the management module 212 may determine that a code was received by the authentication module 204 within a time threshold. The distance threshold and time threshold may be parameters for the wireless tracker that are configurable by a shipper or use of the wireless tracker 200. If the code was determined to be received by the authentication module 204 within both the distance threshold and time threshold then the management module 212 may transmit a notification to a computer server through the communication module 210 verifying chain of custody. Such a notification may be sent to a user device. However, if the code was not received by the authentication module 204 either within a distance threshold or within a time threshold then the management module 212 transmit a notification to a computer server through the communication module 210 indicating a break in the chain of custody that is forwarded to a user device.

In other embodiments, the wireless tracker 200 may determine tampering such as separating the wireless tracker from the shipment. Such determination may involve processing sensor information and other parameters such as, but not limited to, ambient light, conductive tape, irregular motion detection, and orientation of the goods of the shipment.

In further embodiments, the wireless tracker 200 may implement multi-dimensional tracking such as to determine and provide the ability to configure the rules of tracking based on but not limited to if-else-while of various parameter like speed, altitude, temperature, pressure, location and change the behavior of tracking For example, international tracking intervals is changed while at sea, dynamically changing the tracking geo-boundaries and conditions.

In additional embodiments, the wireless tracker 200 can associated its ID (e.g. RFID) with a shipment order information such as order number, purchase order number, Serial Shipment Container Code (SSCC), Billing of Lading number, Lorry Receipt (LR) number, Shipment Manifest number and others. Also, the wireless tracker is associated with the order information of the shipment in-transit for easy lookup. The wireless tracker may be associated with a wireless tracker identifier (e.g. RFID) such that the wireless tracker identifier is associated with shipment order information. Further, a wireless tracker 200 provides the condition of the shipment in transit such as if the shipment is not within its shipping temperature, humidity, moisture limits, or if the shipment was moved from one transport carrier to another, or the shipment was not handled properly.

The RFID tag 208 is used to uniquely identify the wireless tracker 300. Thus, when the RFID tag is read at the shipment origin, the RFID tag is stored by the computer server and associated with the shipment. The RFID tag 208 may be read again at the shipment destination to verify the RFID tag is the same as the one read at the shipment origin. The presence of RFID tag allows the wireless tracker owner to check in wireless tracker devices received after use or check out wireless tracker devices to customers for use with ease. It also provides real time inventory reconciliation and verification of device inventory at each wireless tracker device storage location.

The mail and response card box 201 allows the receiver at the shipment destination to mail the wireless tracker 200 back to the shipment origin or to a central location (e.g. shipper principal shipping location, third party manufacturer, etc.) to be reused for on another shipment. The sensor/power management module 212, in addition to the features described herein, also manages the sensors and the battery power on the wireless tracker 200. This includes configuring the sensors and battery as well as receiving the status of the sensors and battery.

Figure 2B:
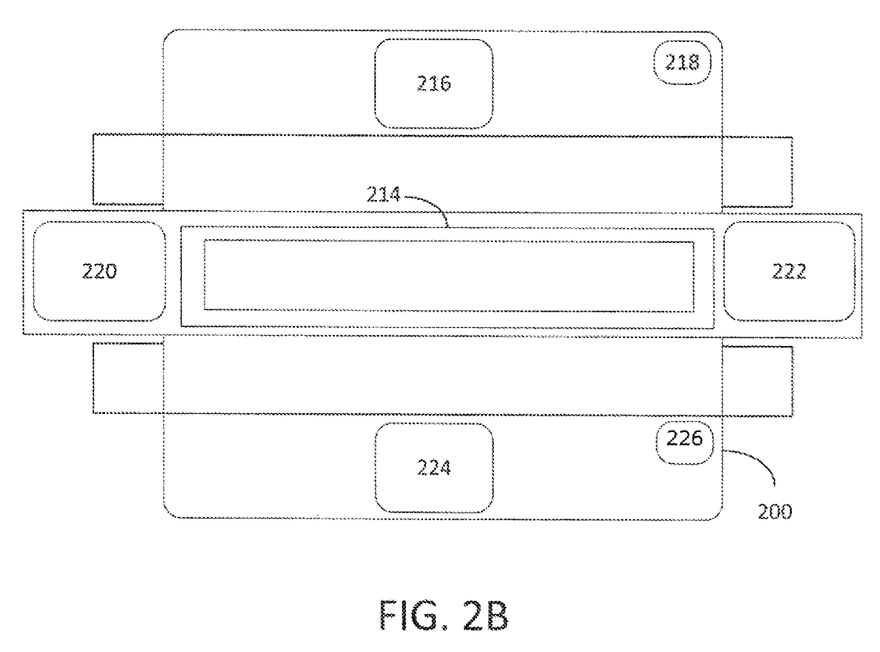

Referring to FIG. 2B, a side of the wireless tracker 200 may have one or more panels (216-226) as well as a foam pad 214. The foam pad 214 may be used to cushion or otherwise reduce vibration impacting the wireless tracker 200. Further, the shipping address may be entered onto panel 216 and associated prepaid postage affixed on panel 218. In addition, the Return to Sender Address may be entered onto panel 224 and associated prepaid postage affixed on panel 226. Advertisements may be affixed onto to panels 220 and 224 for additional revenue for the shipper, shipment delivery company, or third party manufacturer of the wireless tracker 200.

Figure 3:
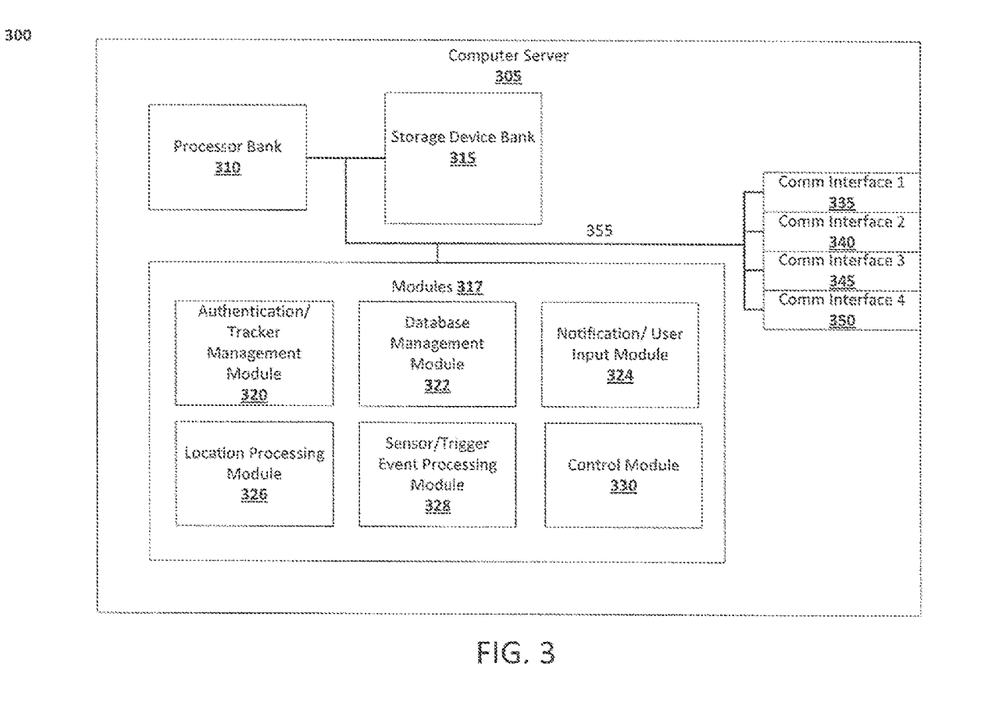
FIGS. 3-4 are functional block diagrams of devices used in tracking a shipment/asset using a wireless tracker, in accordance with some embodiments.

FIG. 3 is functional block diagram of a computer server used in tracking a shipment using a wireless tracker, in accordance with some embodiments. Such a server 305 may be used in a system shown in FIG. 1. The computer server 305 may include several different components such as a processor bank 310, storage device bank 315, one or more software applications, which may be executed by a processor. Thus, the combination of the software applications as well as the processor and any other hardware form specifically-configured modules 317. The computer server 305 also has one or more communication interfaces (335-350). The processor bank 310 may include one or more processors that may be co-located with each other or may be located in different parts of the computer server 305. The storage device bank 315 may include one or more storage devices. Types of storage devices may include electronic memory, optical memory, and removable storage media. The one or more modules 317 may include, but are not limited to, authentication/tracker management module 320, database management module 322, notification/user input module 324, location processing module 326, sensor/trigger event processing module 328, and control module 330. The modules 317 may be implemented by the one or more processors in the processor bank 310.

The computer server 305 and any other server described in the present disclosure may include a database stored in a storage device bank or may be coupled to a database. Further, such a computer server may be part of a computer server system described herein that may include one or more computer servers and one or more databases. In the present disclosure, a computer server may, but not always, refer to embodiments that include a computer server system having one or more computer servers and one or more databases coupled to each other. The one or more computer servers may be co-located with each other or distributed among different locations. Likewise, the one or more one or more databases may be co-located with each other or distributed among different locations. In further embodiments, some of the one or more computer servers may be co-located and coupled to the one or more databases while in additional embodiments some of the one or more computer servers may be coupled to the one or more databases each of which are placed in different location. In still further embodiments, a computer server system may refer to at least one of a computer server and a database. The components shown in FIG. 3 may be located in one computer server or be distributed among more than one computer server and/or databases.

The authentication/tracker management module 320 may perform, in some embodiments, the functions of the authentication module 204 and/or the management module 212 of a wireless tracker described herein. Thus, the authentication/tracker management module 320 may be used in tracking the chain of custody of the shipment associated with a wireless tracker. In one embodiment, a shipper at a shipment origin may enter an authentication code into the authentication module of the wireless tracker. Further, the wireless tracker (via its communication module) may transmit the authentication code to computer server 305. The authentication/tracker management module 320 verifies the authentication code and may provide the wireless tracker and/or a user device with a notification that the authentication code has been verified. Once, the authentication code is verified, the shipment with the wireless tracker is shipped to a shipment destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module of the wireless tracker 204. Further, the wireless tracker (via its communication module) may transmit the authentication code to computer server 305. The authentication/tracker management module 320 verifies the authentication code received at the shipment destination. Further, a notification may be sent to the wireless tracker or the user device that the chain of custody of the shipment has been verified.

The location processing module 326 may determine the location of the shipment based on one or more current locations received from the wireless tracker. Further, the location processing module 326 may access a Global Positioning System (GPS) information (e.g. map information) as well as geo-zone information surrounding one or more shipment locations (i.e. shipment origin, shipment destination, intermediate shipment locations). The location processing module 326 may process such information to determine one or more trigger events. Such trigger events may use the location processing module 326 to communicate with the notification/user input module 324 to send a notification based on the trigger event to a user device. In addition, once a location is determined by the location processing module 326, such location and associated location information may be provided to the authentication/tracker management module for further processing or the notification/user input module 324 to send a notification to the user device.

For example, the location processing module 326 may receive a location of the shipment from the wireless tracker that indicates that the shipment is at the shipment origin. Further, the location processing module 326 has access to information that there is geo-zone surrounding the shipment origin. Subsequently, the location processing module 326 may receive a location of the shipment from the wireless tracker that indicates that the shipment has exited the geo-zone surrounding the shipment origin. The location processing module 326 determines that such an event is a trigger event and thereby communicates with the notification/user input module 324 to send a notification to the user device that the shipment has left the shipment origin.

In further embodiments, the authentication/tracker management module 320 may receive the location of the wireless tracker from the location processing module 326 and may determine that the location of the wireless tracker is within a distance threshold of the shipment destination. Further, the authentication/tracker management module 320 may determine that a code was received by the authentication/tracker management module 320 within a time threshold. The distance threshold and time threshold may be parameters that are configurable by a shipper or user of the wireless tracker. If the code was determined to be received and verified by the authentication/tracker management module 320 within both the distance threshold and time threshold then the authentication/tracker management 320 may transmit a notification (via the notification/user input module 324) to the user device verifying chain of custody. However, if the code was not received by the authentication/tracker management module 320 either within a distance threshold or within a time threshold then the authentication/tracker management module 320 transmit a notification (via the notification/user input module 324) to the user device indicating a break in the chain of custody.

In some embodiments, the authentication/tracker management module 320 is configured to determine a current location of the wireless tracker device at one or more intervals wherein the one or more intervals are based on a delivery route of the shipment. For example, the authentication/tracker management module 320 may be configure the wireless tracker to determine its location frequently within a distance threshold of the shipment origin or shipment destination. However, the authentication/tracker management module 320 may configure the wireless tracker to determine its location not as frequently beyond the distance threshold of the shipment origin and prior to the distance threshold of the shipment destination. Although such a configuration manages battery life of the wireless tracker, such a configuration also avoids a situation when a user defines an alert condition when an asset associated with the wireless tracker enters and exits a specified geographic boundary that may not have been provided if the update interval was simply 30 minutes. In such a scenario, if the asset enters and exits the specified geographic boundary within 30 minutes then the tracing device fails to provide an update.

In other embodiments, the wireless tracker provides an update regarding remaining battery life of the wireless tracker to the computer server 305. Further, the remaining battery life nay be forwarded to a user device by the notification/user input module 324. The authentication/tracker management module 320 may determine to adjust (automatically or based on user input in response to the notification of remaining battery life) the frequency of location and sensor updates of the wireless tracker to better manage the remaining battery life and provides such configuration information to the wireless tracker, accordingly. Further based on a route of the wireless tracker (the route may be preprogrammed into the computer server 305 or determined by the computer server 305 based on one or more location updates provided by the wireless tracker), may provide configuration information to regulate the battery life of the wireless tracker. In additional embodiments, the computer server 305 may receive and process one or more location updates from the wireless tracker to determine a route deviation of the wireless tracker. The computer server may provide additional configuration information to further regulate the battery life based on the route deviation.

In further embodiments, the computer server 305 may receive the current location of the wireless tracker and the location processing module 326 determines that the current location of the wireless tracker is a shipment destination. The authentication/tracker management module may determine a return address of the wireless tracker based on logistics information and send a return address to a shipment destination device such as a computer, smartphone, or printer allowing shipment destination personal to print a label with the return address and postage to affix to the wireless tracker and returned to the wireless tracker device owner. In such embodiments, the logistics information may be processed to determine that the wireless tracker should be returned to the shipment origin. Alternatively, the logistics information may be processed to determine that the wireless tracker should be sent to another location that it would be more useful.

In other embodiments, the computer server 305 may determine a shipment destination for a wireless tracker. The authentication/tracker management module may determine a return address of the wireless tracker based on logistics information and generate a label with a return address configured to be coupled to one or more panels of the wireless tracker. In such embodiments, the logistics information may be processed to determine that the wireless tracker should be returned to the shipment origin. Alternatively, the logistics information may be processed to determine that the wireless tracker should be sent to another location that it would be more useful. In still another alternative, logistics information may be processed to determine that the wireless tracker can be used with a new shipment originating from the shipment destination and need not be returned to another location upon arrival.

In additional embodiments, the computer server 305 may determine tampering of the wireless tracker such as separating the wireless tracker from the shipment. Such determination may involve processing sensor information and other parameters such as, but not limited to, ambient light, conductive tape, irregular motion detection, and orientation of the goods of the shipment.

In further embodiments, the computer server 305 may implement multi-dimensional tracking of the wireless tracker such as to determine and provide the ability to configure the rules of tracking based on but not limited to if-else-while of various parameter like speed, altitude, temperature, pressure, location and change the behavior of tracking For example, international tracking intervals is changed while at sea, dynamically changing the tracking geo-boundaries and conditions.

In additional embodiments, the wireless tracker can associated its ID (e.g. RFID) with a shipment order information such as order number, purchase order number, Serial Shipment Container Code (SSCC), Billing of Lading number, Lorry Receipt (LR) number, Shipment Manifest number and others, and provides such information to the computer server for further processing and notification to the user. Also, the wireless tracker is associated with the order information of the shipment in-transit for easy lookup. Further, a wireless tracker provides to the computer server 305 the condition of the shipment in transit such as if the shipment is not within its shipping temperature, humidity, moisture limits, or if the shipment was moved from one transport carrier to another, or the shipment was not handled properly such that the computer server notifies or takes action on such information.

The database management module 322 manages the storage and access of information related to the operation of the wireless tracker or shipment information. For example, the database management module 322 may store one or more locations of the shipment that is provided by a wireless tracker. In addition, the database management module 322 may store information from one or more sensors coupled to and provided by the wireless tracker. Such location information and sensor information may be used to determine a trigger event to notify the shipper.

The notification/user input module 324 may perform several different functions. One such function may be to receive user input from a user device. Such user input may be configuration parameters for operating the wireless tracker. These may include specified times or locations to query the wireless tracker for sensor information, location, or other status information. Another function of the notification/user input module 424 to provide a notification based on a trigger event to the user device. A notification may be generated based on a trigger event determined by the different modules of the computer server 305 such as, but not limited to, the authentication/tracker module 320, location processing module 326, and the sensor/trigger event processing module 328.

The sensor/trigger event processing module 328 may receive sensor information from the wireless tracker. Further, the sensor/trigger event processing module may determine certain trigger events based on the received sensor information and send a notification (via the notification/user input module 324) to a user device. In addition, the sensor/ trigger event processing module may be programmed or receive configuration parameters to be forwarded to the wireless tracker for its operation. For example, the configuration parameters may include time and location of providing location and other sensor information as well as at which time periods to operate the different sensors to regulate battery life.

In some embodiments, the computer server 305 may receive a notification from the wireless tracker. Further, the computer server 305 may process the information in the notification based on configuration parameters and transmit information to the wireless tracker to take some further action. For example, a user may be tracking a shipment traveling from Las Vegas to Washington, D.C. (by air transport) with an intermediate stop in Dallas during the winter season. However, the computer server 305 may receive a notification that the shipment was diverted to have an intermediate stop at Chicago instead of Dallas due to severe weather conditions surrounding the Dallas area. The computer server 305 may have configuration information that includes that the shipment may be temperature sensitive and cannot be in environment less than 32 degrees Fahrenheit. Further, the computer server may have additional configuration information that if the shipment is at a location above a certain latitude or in a certain geographical area, to request the wireless tracker take a temperature reading with its temperature sensor and provide such temperature sensor information to the computer server 305. Further, if the computer server 305 is notified that the temperature is less than 32 degrees Fahrenheit, then the computer server may send a notification to shipper personnel to place the shipment in a warmer environment.

The control module 330 includes software and hardware functions that assist in performing certain tasks for the computer serve 305 such as providing access to a communication link (e.g. wired, wireless, Bluetooth, infra-red, RF, etc.), executing an operating system, managing software drivers for peripheral components, and processing information. In addition, the control module 330 may also include software drivers for peripheral components, user interface computer programs, debugging and troubleshooting software tools. Also, the control module 330 may include an operating system. Such operating systems are known in the art for computer server 305 but may also include computer operating systems (e.g. Windows, Linux, UNIX, and MacOS, etc.).

Each of the communication interfaces (335-350) may be software or hardware associated in communicating to other devices. The communication interfaces (335-350) may be of different types that include a user interface, USB, Ethernet, WiFi, WiMax, wireless, optical, cellular, or any other communication interface coupled to a communication network. One or more of the communication interfaces (335-350) may be coupled to a user interface known in the art.

An intra-device communication link 355 between the processor bank 310, storage device bank 315, modules 317, and communication interfaces (335-350) may be one of several types that include a bus or other communication mechanism.

Figure 4:
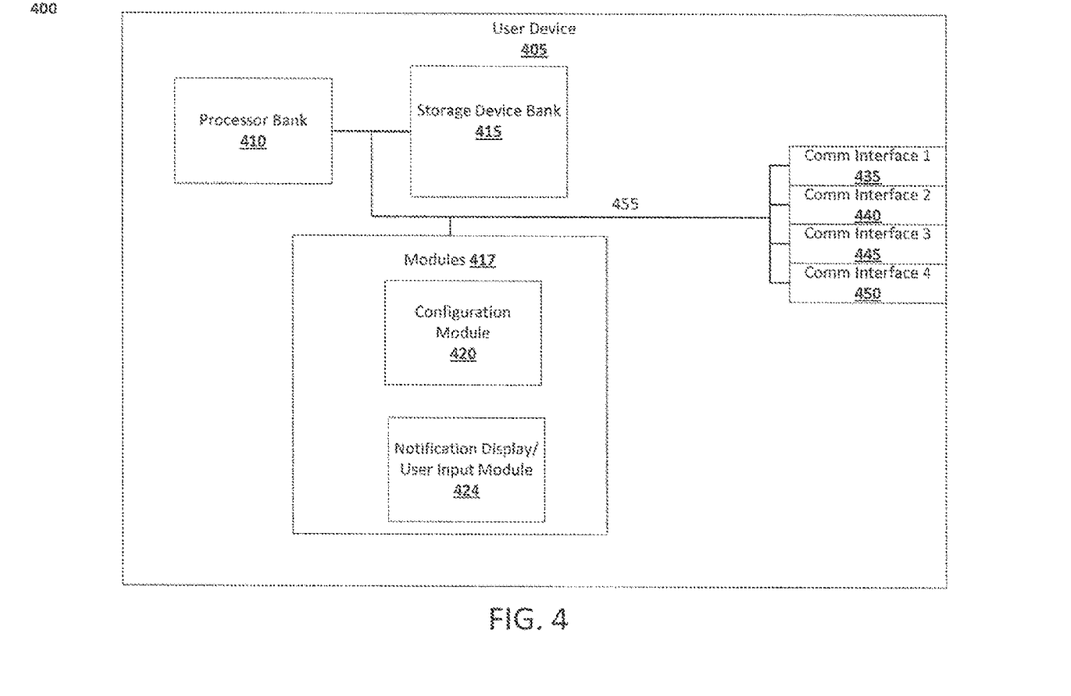

FIG. 4 is functional block diagram of a user computing device 405 for providing configuration information to a wireless tracker as well as receiving trigger event notifications based on wireless tracker information, in accordance with some embodiments. Such a user device 405 may be used in a system shown in FIG. 1. The user device 405 may include several different components such as a processor bank 410, storage device bank 415, one or more software applications, which may be executed by a processor. Thus, the combination of the software applications as well as the processor and any other hardware form specifically-configured modules 417. The user device 405 also has one or more communication interfaces (435-450). The processor bank 410 may include one or more processors that may be co-located with each other or may be located in different parts of the shipper computing device 405. The storage device bank 415 may include one or more storage devices. Types of storage devices may include electronic memory, optical memory, and removable storage media. The one or more modules 417 may include, but are not limited to, a configuration module 420 and a notification display/user input module 424. The modules 417 may be implemented by the one or more processors in the processor bank 410. Examples of user devices, include, but are not limited to, desktop computers, laptop computers, tablet computers, smartphones, and any other computing devices.

A user may provide configuration information for a wireless tracker. Such user input may be entered into a user interface (one or of the communication interfaces (435-450)) and may be received by the notification display/user input module 424. Such configuration information may include time and location of providing location and other sensor information of the wireless tracker as well as at which time periods to operate the different sensors of the wireless tracker to regulate its battery life. The configuration module 420 may process such configuration information and determine whether such user input may conflict with current operation of the wireless tracker or with a prior configuration of the wireless tracker. If so, the configuration module may provide a notification on the notification display 424. If not, the configuration information may then transmitted to one or more computer servers over one of the communication interfaces (435-450). Also, the notification display/user input module 424 may receive a notification from the computer server(s) via the communication interface (435-450) and display such a notification on a user interface.

In some embodiments, the user device 405 may receive a notification from the wireless tracker (via a computer server) and present the notification to a user on a user device display. Further, the user may enter information into a user device user interface that may be transmitted to the wireless tracker (via the computer server) to take some further action. For example, a user may be tracking a shipment traveling from Las Vegas to Washington, D.C. (by air transport) with an intermediate stop in Dallas during the winter season. However, the user device 405 may receive a notification that the shipment was diverted to have an intermediate stop at Chicago instead of Dallas due to severe weather conditions surrounding the Dallas area. The shipment may be temperature sensitive and cannot be in environment less than 32 degrees Fahrenheit. The user may input information that is transmitted to the wireless tracker (via the computer server) to request the wireless tracker take a temperature reading with its temperature sensor and provide such temperature sensor information to the user device (via the computer server). Further, if the user is notified that the temperature is less than 32 degrees Fahrenheit, then the user may enter information to the computer server to notify shipper personnel to place the shipment in a warmer environment.

Each of the communication interfaces (435-450) may be software or hardware associated in communicating to other devices. The communication interfaces (435-450) may be of different types that include a user interface, USB, Ethernet, WiFi, WiMax, wireless, optical, cellular, or any other communication interface coupled to a communication network.

One or more of the communication interfaces (435-450) may be coupled to a user interface known in the art.

An intra-device communication link 455 between the processor bank 410, storage device bank 415, modules 417, and communication interfaces (435-450) may be one of several types that include a bus or other communication mechanism.

Figure 5A:
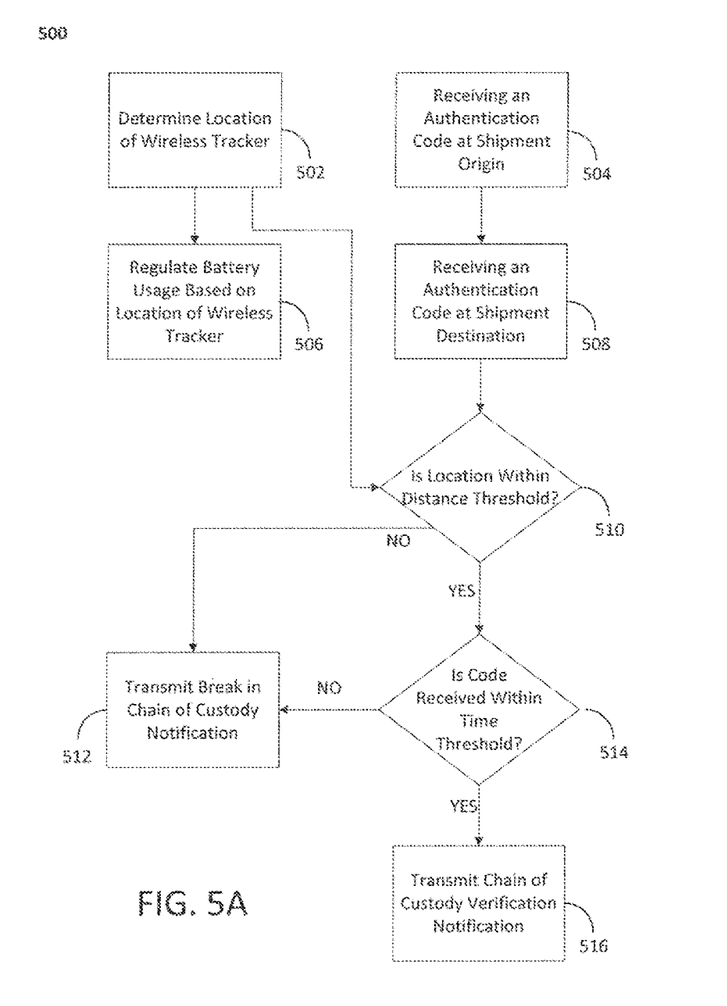
FIGS. 5A-5C are flowcharts that illustrates methods for tracking a shipment/asset using a wireless tracker, in accordance with some embodiments.
Figure 5B:
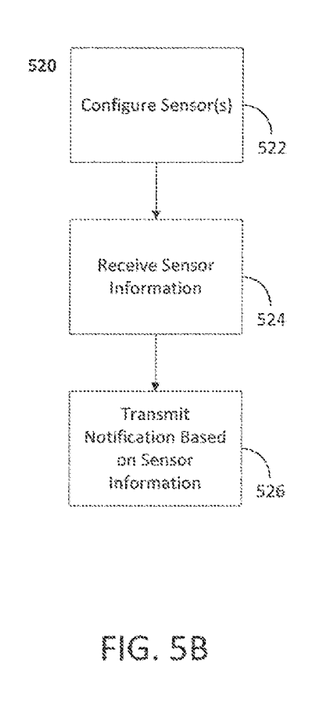
Figure 5C:
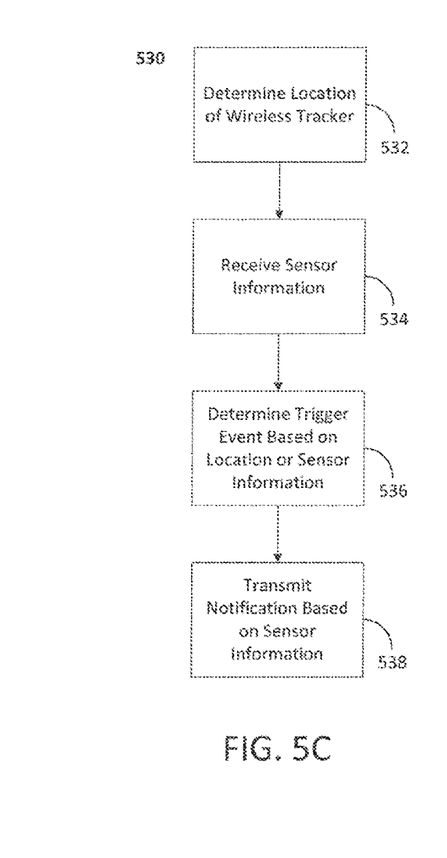

FIGS. 5A-5C are flowcharts that illustrates methods for using a wireless tracker with a shipment, in accordance with some embodiments. Referring to FIG. 5A, method 500 includes determining, by a communication module of a wireless tracker associated with a shipment, a location of the wireless tracker device, as shown in block 502. Further, the method 500 includes regulating, by a management module of the wireless tracker, a battery of the wireless tracker based on the location of the wireless tracker device, as shown in block 506. In addition, the method 500 includes receiving, by the authentication module, a code at a shipment origin, as shown in block 504. Moreover, the method includes receiving, by the authentication module, a code a shipment destination, at a block 508. Also, the method 500 includes determining, by the management module, that the location of the wireless tracker device is within a distance threshold of the shipment destination, as shown in block 510. Further, the method 500 includes determining that a code was not received by the authentication module within a time threshold, as shown in block 514. In addition, the method 500 includes transmitting a notification to a computer server through the communication module indicating a break in the chain of custody, as shown in block 512. Moreover, the method 500 includes determining, by the management module, that the location of the wireless tracker device is not within a distance threshold of the shipment destination, as shown in block 510. Also, the method 500 includes transmitting, by the management module, a notification to a computer server through the communication module indicating a break in the chain of custody, as shown in block 512. In certain embodiments, the authentication code may have received the code either not within the distance threshold of the shipment destination or not within the time threshold as configured. In either scenario, the method 500 includes transmitting a break in chain of custody notification to a computer server and forwarded to a user device, as shown in block 512. However, if a code is received and verified within a distance threshold of the shipment destination and within a configured time threshold (and the code is authenticated) then the method 500 includes verifying, by the authentication module, the one or more codes, for a chain of custody of the shipment and transmitting a chain of custody verification notification to a computer server and forwarded to a user device, as shown in block 516.

Referring to FIG. 5B, the method 520 includes configuring, by the management module, one or more sensors of the wireless tracker, as shown in block 522. Further, the method 520 includes receiving, by the management module, sensor information from the one or more sensors, as shown in block 524. In addition, the method 520 includes transmitting a notification based on the sensor information to a computer server and forwarded to a user device, as shown in block 526.

Referring to FIG. 5C, the method 530 includes determining a location of the wireless tracker, as shown in block 532. Further, the method 530 includes receiving, by the management module, sensor information from the one or more sensors, as shown in block 534. In addition, the method 530 includes determining, by the management module, a trigger event based on at least one of the location of the wireless tracker device and sensor information, as shown in block 536. Moreover, the method 530 includes transmitting or sending, by the communication module, a notification to a computer server through the communication module based on the trigger event and forwarded to a user device, as shown in block 538.

Persons of ordinary skill in the art understand that the steps of methods described herein can be implemented in any order and not limited to the order discussed in the present disclosure. Further, functions implemented by modules within the computer server(s) described herein may also be implemented in the modules of the wireless tracker. In addition, functions implemented by the module of the wireless tracker may also be implemented by the computer server(s). Moreover, functions implemented by modules within the computer server(s) described herein may also be implemented in the modules of the user device. Also, functions implemented by modules within the user device described herein may also be implemented in the modules of the computer server(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless tracker device, comprising:
   a communication module configured to determine a location of the wireless tracker device;
   a management module configured to reduce a frequency of location updates sent from the wireless tracker device when the location of the wireless tracker device has yet to reach a destination distance threshold;
   wherein the destination distance threshold is measured between the location of the wireless tracker device and a shipment destination location;
   an authentication module configured to determine whether the location of the wireless tracker device is within the destination distance threshold of the shipment destination when a code was received and whether the code was received within a time threshold of the wireless tracker device being located within the destination distance threshold of the shipment destination; and
   wherein the communication module is configured to transmit a chain of custody notification to a computer server to indicate whether there was a break in the chain of custody.

2. The wireless tracker device of claim 1, wherein the management module provides an update regarding remaining battery life of the wireless tracker device.

3. The wireless tracker device of claim 1, wherein the management module regulates battery usage based on a route deviation of the wireless tracker device.

4. The wireless tracker device of claim 1, wherein the wireless tracker device is associated with a wireless tracker identifier such that the wireless tracker identifier is associated with shipment order information.

5. The wireless tracker device of claim 1, further comprising:
   one or more panels that include at least one of a recipient address, and recipient postage such that the wireless tracker device is delivered to the recipient address.

6. The wireless tracker device of claim 1, wherein the communication module is configured to determine a current location of the wireless tracker device at one or more intervals wherein the one or more intervals are based on a delivery route of the shipment.

7. The wireless tracker device of claim 1, wherein the wireless tracker device is configured to receive the code and transmit a code notification to indicate the code was received.

8. The wireless tracker device of claim 1, wherein the authentication module receives the code at a shipment origin.

9. The wireless tracker device of claim 1, wherein the authentication module receives the code at a shipment destination.

10. The wireless tracker device of claim 1, wherein the management module is configured to:
    determine that the location of the wireless tracker device is within the destination distance threshold of the shipment destination;
    determine that the code was not received by the authentication module within the time threshold; and
    transmit the chain of custody notification to the computer server through the communication module to indicate a break in the chain of custody.

11. The wireless tracker device of claim 1, wherein the management module is configured to:
    determine that the location of the wireless tracker device is not within the destination distance threshold of the shipment destination;
    determine that the code was received by the authentication module within the time threshold;
    transmit the chain of custody notification to the computer server through the communication module to indicate a break in the chain of custody.

12. The wireless tracker device of claim 1, further comprising:
    one or more sensors; and
    wherein the management module is configured to enable the one or more sensors and receive sensor information from the one or more sensors.

13. The wireless tracker device of claim 9, wherein the management module is configured to:
    determine a trigger event based on at least one of the location of the wireless tracker device and sensor information; and
    send the chain of custody notification to the computer server through the communication module based on the trigger event.

14. A method, comprising:
    determining, by a communication module of a wireless tracker device associated with a shipment, a location of the wireless tracker device;
    reducing, by a management module of the wireless tracker device, a frequency of location updates sent from the wireless tracker device when the location of the wireless tracker device has yet to reach a destination distance threshold;
    wherein the destination distance threshold is measured between the location of the wireless tracker device and a shipment destination location;
    determining via an authentication module whether the location of the wireless tracker device is within the destination distance threshold of the shipment destination when a code was received and whether the code was received within a time threshold of the wireless tracker device being located within the destination distance threshold of the shipment destination; and
    transmitting a chain of custody notification to a computer server to indicate whether there was a break in the chain of custody.

15. The method of claim 14, wherein the management module provides an update regarding remaining battery life of the wireless tracker device.

16. The method of claim 14, wherein the management module regulates battery usage based on a route deviation of the wireless tracker device.

17. The method of claim 14, wherein the wireless tracker device is associated with a wireless tracker identifier such that the wireless tracker identifier is associated with shipment order information.

18. The method of claim 14, wherein the wireless tracker device includes one or more panels that include at least one of a sender address, sender postage, recipient address, and recipient postage such that the wireless tracker device is delivered to the recipient address.

19. The method of claim 14, wherein the communication module is configured to determine a current location of the wireless tracker device at one or more intervals wherein the one or more intervals are based on a delivery route of the shipment.

20. The method of claim 14, further comprising receiving the code and transmitting a code notification to indicate the code was received.

21. The method of claim 14, further comprising receiving, by the authentication module, the code at a shipment origin.

22. The method of claim 14, further comprising receiving, by the authentication module, the code at the shipment destination.

23. The method of claim 14, further comprising:
determining, by the management module, that the location of the wireless tracker device is within the destination distance threshold of the shipment destination;
determining that the code was not received by the authentication module within the time threshold; and
transmitting the chain of custody notification to the computer server through the communication module indicating a break in the chain of custody.

24. The method of claim 14, further comprising:
determining, by the management module, that the location of the wireless tracker device is not within the destination distance threshold of the shipment destination;
determining, by the management module, that the code was received by the authentication module within the time threshold; and
transmitting, by the management module, the chain of custody notification to the computer server through the communication module indicating a break in the chain of custody.

25. The method of claim 14, further comprising:
configuring, by the management module, one or more sensors of the wireless tracker device;
receiving, by the management module, sensor information from the one or more sensors.

26. The method of claim 25, further comprising:
determining, by the management module, a trigger event based on at least one of the location of the wireless tracker device and the sensor information;
sending, by the communication module, the chain of custody notification to the computer server through the communication module based on the trigger event.

27. A system, comprising:
a wireless tracker device associated with a shipment, having:
a communication module configured to determine a location of the wireless tracker device;
a management module configured to reduce a frequency of location updates sent from the wireless tracker device when the location of the wireless tracker device has yet to reach a destination distance threshold,
wherein the destination distance threshold is measured between the location of the wireless tracker device and a shipment destination location, an authentication module configured to
determine whether the location of the wireless tracker device is within the destination distance threshold of the shipment destination when a code was received and whether the code was received within a time threshold of the wireless tracker device being located within the destination distance threshold of the shipment destination; and
wherein the communication module is configured to transmit a chain of custody notification to a computer server to indicate whether there was a break in the chain of custody.

28. The system of claim 27, wherein the management module provides an update regarding remaining battery life of the wireless tracker device.

29. The system of claim 27, wherein the management module regulates battery usage based on a route deviation of the wireless tracker device.

30. The system of claim 27, wherein the wireless tracker device is associated with a wireless tracker identifier such that the wireless tracker identifier is associated with shipment order information.

31. The system of claim 27, wherein the wireless tracker device includes one or more panels that include at least one of a recipient address, and recipient postage such that the wireless tracker device is delivered to the recipient address.

32. The system of claim 27, further comprising: a computer server configured to:
determine a route of the wireless tracker device;
determine a shipment destination based on the route;
determine a return address of the wireless tracker device based on logistics information;
generate a return address on a label configured to couple to one or more panels of the wireless tracker device.

33. The system of claim 27, wherein the communication module is configured to determine a current location of the wireless tracker device at one or more intervals wherein the one or more intervals are based on a delivery route of the shipment.

34. The system of claim 27, wherein the wireless tracker device includes an authentication module configured to receive and verify one or more codes for a chain of custody of the shipment.

35. The system of claim 34, wherein the authentication module receives the code at a shipment origin.

36. The system of claim 34, wherein the authentication module receives the code at a shipment destination.

37. The system of claim 34, further comprising a computer server coupled to the wireless tracker device;
wherein the management module of the wireless tracker device is configured to:
determine that the location of the wireless tracker device is within the destination distance threshold of the shipment destination;
determine that the code was not received by the authentication module within the time threshold; and
transmitting the chain of custody notification to the computer server through the communication module indicating a break in the chain of custody.

38. The system of claim 37, further comprising a user device that receives the chain of custody notification indicating a break in the chain of custody.

39. The system of claim 34, further comprising a computer server coupled to the wireless tracker device;
   wherein the management module is configured to:
      determine that the location of the wireless tracker device is not within the destination distance threshold of the shipment destination;
      determine that the code was received by the authentication module within the time threshold;
      transmitting the chain of custody notification to the computer server through the communication module indicating a break in the chain of custody.

40. The system of claim 39, further comprising a user device that receives the notification indicating a break in the chain of custody.

41. The system of claim 27, wherein the wireless tracker device includes one or more sensors and wherein the management module configured to configure the one or more sensors and receives sensor information from the one or more sensors.

42. The system of claim 41, further comprising a computer server coupled to the wireless tracker device;
   wherein the management module of the wireless tracker device is configured to:
      determine a trigger event based on at least one of the location of the wireless tracker device and the sensor information; and
      send the chain of custody notification to the computer server through the communication module based on the trigger event.

43. The system of claim 42, further comprising a user device that receives the chain of custody notification based on the trigger event.

\* \* \* \* \*